Figure 1:
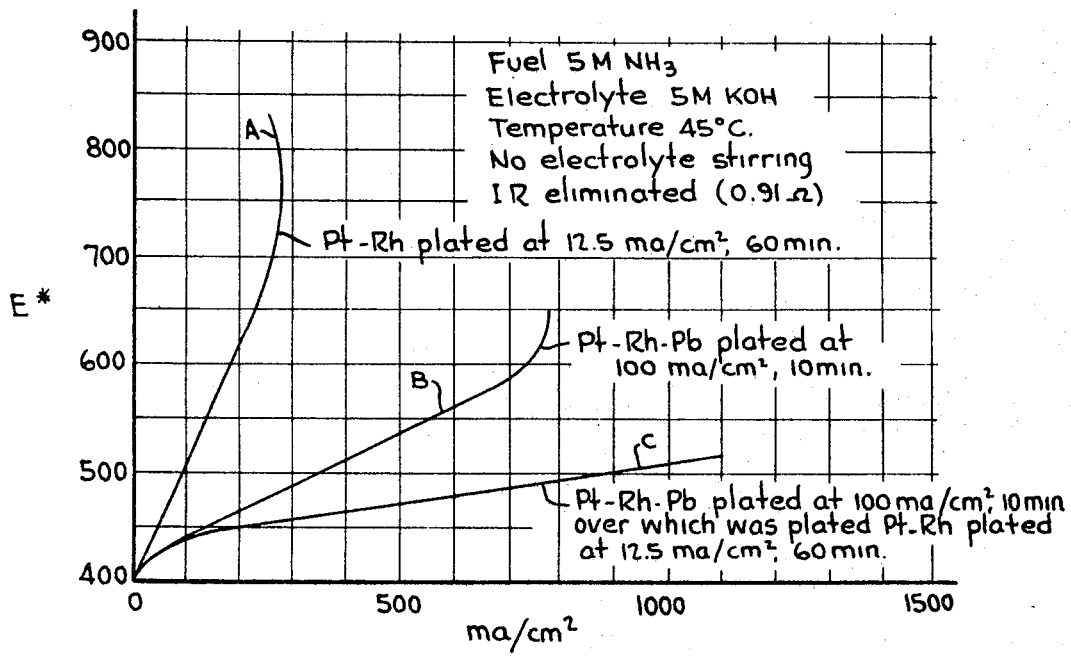

United States Patent Office 3,444,003
Patented May 13, 1969

3,444,003
MULTILAYER CATALYTIC ELECTRODE HAVING A LAYER OF NOBLE METAL AND LEAD AND A SURFACE LAYER FREE OF LEAD AND METHOD OF CONSTRUCTING SAME
James R. Moser, Bolton, Conn., assignor, by mesne assignments, to Leesona Corporation, Cranston, R.I., a corporation of Massachusetts
Filed Sept. 30, 1965, Ser. No. 491,762
Int. Cl. H01m 27/10
U.S. Cl. 136—120               6 Claims This invention relates to novel electrodes for use in an electrochemical device such as a fuel cell; to the process of preparing said electrodes, and to the electrochemical device employing the electrodes. More particularly, the invention embraces multi-layer catalytic electrodes having enhanced reactivity comprising a roughened high surface area base layer and a smooth, substantially continuous top layer. For convenience, the invention will be described hereinafter with emphasis being placed on the use of the novel structures in a fuel cell. It will be apparent, however, that the structures of the invention can be employed in other electrochemical devices where similar considerations apply.

The application of thin layers of a relatively precious metal to a base material by electro-deposition is commonly employed to provide an adherent layer. Since the layer deposited can be exceedingly thin, relatively small amounts of the precious metal can be laid down while providing the rich appearance of, and the protection offered by the precious metal. These layers are normally smooth and, therefore, provide only minimal problems regarding the adherence of the deposit to the base surface.

Although the electro-deposition of catalytic metals to base metals has been suggested, certain problems exist. Thus, it is recognized in the field of catalysis that the amount of product formed using a particular catalyst is directly proportional to the area of the catalyst involved in the reaction. Therefore, to obtain a useful quantity of product, whether it be an electrical current or a chemical compound, from a catalyzed heterogeneous reaction, a high surface area as well as an active catalyst must be utilized. Therefore, while the use of the electrochemical deposition technique has been suggested for applying a catalytic surface to a base material, including fuel cell electrodes, the electro-deposits are smooth, having only limited surface area. Electro-deposition upon roughened, or high area surfaces, is complicated in that the electroplated particles are not necessarily attached to the substrate, but rather to substrate and/or other deposited particles. Therefore, the need for a means of obtaining a high surface area, adherent and coherent electro-deposited catalytic surface is apparent.

Accordingly, it is an object of the present invention to provide an electro-deposited catalytic surface which possesses a high surface area, and which has a highly active coherent-adherent catalytic surface.

It is another object of this invention to provide an electro-deposited layer having a high roughness factor, or a large surface area.

It is another object of this invention to provide a multilayer electrode for a fuel cell which electrode develops remarkably enhanced current densities at low polarization rates.

It is another object of this invention to provide a multilayer electrode for a fuel cell which has high endurance under the working conditions of the fuel cell, and provides a high current density.

These and other objects of the invention will be readily apparent from the following detailed description, with particular emphasis being placed upon the working embodiment and the accompanying drawing.

Figure 2:
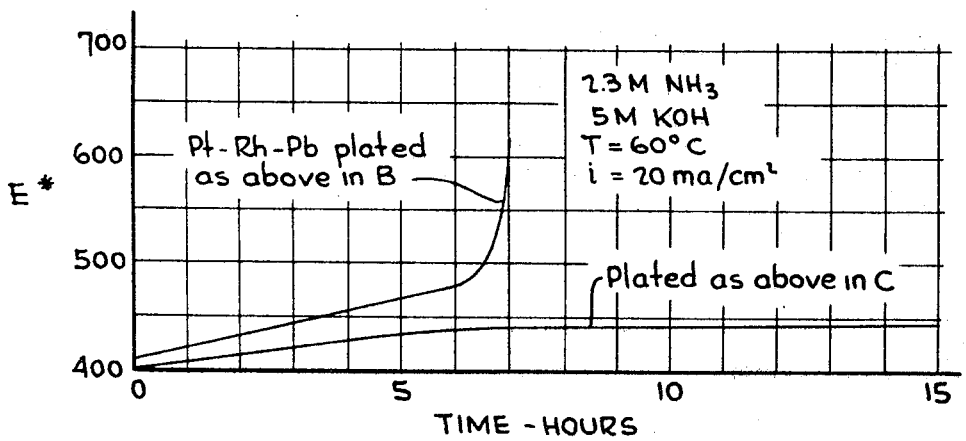

The aforesaid objects of the invention are accomplished by roughening the surface of a substrate by electro-deposition to enlarge the surface area, and thereafter applying a uniform shiny deposit over the roughened layer. The shiny deposit functions similar to a membrane stretched over the surface of the first deposit enabling the first deposit to remain intact and not be extricated by the physical motion of the electrolyte solution in a fuel cell. The roughened surface is obtained according to the invention by electro-depositing a catalytic material onto a base surface from an electroplating solution containing the catalytic material and minor amounts of lead ions. The surface obtained possesses a very high surface area. Thereafter, a shiny surface is deposited upon the roughened layer from an electroplating solution of the catalytic material which is free of lead ions. The shiny surface which uniformly covers the roughened area provides a large catalytic surface, since it is in intimate contact with the irregular surface, which is both coherent and adherent. The resultant structure, when used as fuel cell electrodes provide greatly enhanced current densities in comparison to electrodes where the catalytic layer is laid down upon the base substrate in the absence of the lead ions, and where the catalytic layer is laid down in the presence of lead ions but where the second deposit is omitted. The enhanced performance is readily seen from the drawing wherein FIGURE 1 compares polarization curves of three electrodes, electrode A being prepared by a conventional electrodeposition technique, electrode B being prepared using lead ions in the electroplating solution, but omitting the second deposit, and electrode C prepared by technique B and additionally applying a second deposit over the roughened surface. FIGURE 2 demonstrates the superior endurance of the improved electrode. The curves of the drawings will be discussed more fully hereinafter.

The base surface of the electrode can be a normally conductive surface such as platinum, nickel, copper, gold tantalum, zirconium, iron, and alloys thereof, or it can be a non-conductive material rendered conductive by applying a conductive surface thereto. It is necessary that the structure be electrochemically conductive, and able to withstand the corrosive operating environment of a fuel cell. In view of their over-all properties, including their resistance to corrosion and relative inexpensiveness, nickel, titanium, and tantalum supports are preferred.

The catalytic metal which is to be applied to the metal support can be any of the various metals which will favorably influence the particular reaction to be catalyzed. Such metals include columbium, nickel, iron, gold, copper, palladium, platinum, rhodium, ruthenium, osmium, iridium, and alloys thereof. These metals are to be applied to the base substrate by electro-deposition in the presence of lead ions. The lead ions can be provided by any soluble lead salt, such as lead acetate.

The top shiny layer again will be any of the catalytically active metals enumerated hereinabove. However, because of their excellent properties, insofar as favorably influencing an electrochemical reaction, the Group VIII metals of Mendelyeev's Periodic Table are preferred. Normally, the first layer will be from about 20 to 80 mils thick and the second layer from about 0.1 to 0.5 mil thick. Optimum results are obtained from electrodes wherein the roughened layer is from 25 to 50 mils thick, and the shiny layer is from 0.1 to 0.2 mil thick.

The electro-deposition can be performed employing procedures known in the art. Normally, however, the deposition will be accomplished by immersing the substrate to be plated in an aqeous solution of the catalytic metals in the presence of minor amounts of the lead salt. Ambient temperatures are preferred. Similar conditions are employed in depositing the second or shiny layer.

The electrodes prepared according to the present invention can be used in fuel cells employing any of the prior art electrolytes such as the alkali metal hydroxides and acid electrolytes such as sulfuric and phosphoric acid. It is only essential that the electrolyte remain invariant, or substantially invariant, under the operating conditions of the cell. Additionally, the electrodes can be employed with various fuels including hydrogen, the hydrocarbons and ammonia. By properly selecting the catalytic metal, enhanced results can be obtained with substantially any fuel.

Having described the invention in general terms, the following example is set forth to more particularly illustrate the invention.

Example

A platinum foil substrate 3 mils thick and 1 centimeter square was cleaned by immersion in a 60 percent aqua regia solution followed by immersion in concentrated nitric acid. The substrate was treated anodically for 10 minutes in 1 normal sulfuric acid at room temperature and at 100 ma./cm.$^2$, and then cathodically for 3 minutes at 100 ma./cm.$^2$ in the same solution. The cleaned platinum foil substrate was transferred to a beaker containing a solution of 0.1 molar platinum; $3.25 \times 10^{-3}$ molar rhodium and $2 \times 10^{-3}$ molar lead. The surface was treated cathodically at 100 ma./cm.$^2$ for 10 minutes without stirring. The treatment produced a high surface area deposit. Thereafter, the treated platinum substrate was transferred to a second beaker containing a solution of 0.1 molar platinum and $3.25 \times 10^{-3}$ molar rhodium (no lead being present). Plating was carried out at 12.5 ma./cm.$^2$ for 60 minutes without stirring. The resultant structure was washed.

The electrode so formed was tested as a half cell and fed with 5 molar ammonium at 45° C. The electrolyte was a 5 molar potassium hydroxide aqueous solution. At a current density of over 1,000 ma./cm.$^2$, the electrode had a polarization of slightly over 500 millivolts. In contrast, an electrode having the same substrate, and plated with platinum and rhodium had a polarization of over 800 millivolts at a limiting current density of less than 300. Although an electrode having the same substrate and plated with platinum, rhodium, and lead demonstrated improved results over the electrode plated only with platinum and rhodium, a limiting current density was reached at less than 800 ma./cm.$^2$. Additionally, the endurance of the electrode prepared according to the present invention is greatly superior to the other electrodes tested. These results are readily apparent from the drawing wherein FIGURE 1 plots the data obtained from the aforesaid three electrodes under identical conditions. From FIGURE 2, it is readily seen that the electrode prepared according to the invention (electrode C) has little change in performance between the periods of 6 and 15 hours of continuous operation, whereas electrode B is completely polarized at about 7 hours operation, again under identical conditions.

In the aforesaid example, the platinum foil substrate can be replaced by other substrates including copper, silver, gold, iron, and palladium, as well as normally nonconductive surfaces such as polyethylene, polytetrafluoroethylene, and the like, which have been rendered conductive by application of a conductive metal. Additionally, the metal of the catalytic layer can be replaced by other electrochemically active materials including nickel, copper, gold, silver, palladium, ruthenium, and rhodium.

As will be apparent to one skilled in the art, the illustrative example is only set forth as a preferred embodiment of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices.

It is claimed:

1. A method of constructing an electrode for use in an electrochemical device comprising the steps of electrodepositing a layer of catalytic metal from a aqueous solution consisting essentially of a catalytic noble metal and lead onto a base substrate having a conductive surface, said catalytic metal being present in said solution in a major amount and said lead being present in said solution in a minor amount, and thereafter electrodepositing a second layer upon said first electrodeposited layer from a solution of a catalytic noble metal free of lead.

2. The method of claim 1 wherein the aqueous solution of catalytic metal consists essentially of platinum and rhodium.

3. The method of claim 2 wherein the base substrate is a platinum foil.

4. An electrode structure for use in an electrochemical device comprising a base substrate having a conductive surface and having a first layer, said first layer consisting essentially of a catalytic noble metal in a major amount and lead in a minor mount, and a second layer electrodeposited on said first layer, said second layer being free of lead.

5. The electrode of claim 4 wherein the base metal is platinum foil.

6. The electrode of claim 5 wherein the catalytic metal is a mixture of platinum and rhodium.

References Cited

UNITED STATES PATENTS

| | | | |
|---|---|---|---|
| 1,779,457 | 10/1930 | Zschiegner | 204—47 |
| 2,470,033 | 5/1949 | Hensel | 204—47 |
| 2,751,341 | 6/1956 | Smart | 204—53 |
| 3,150,011 | 9/1964 | Winsel et al. | 136—120 |
| 3,202,594 | 8/1965 | Steele | 204—290 |

OTHER REFERENCES

"Physico-Chemical Methods," by Joseph Reilly and William Norman Rae, Vol. II, 1954.

WINSTON A. DOUGLAS, *Primary Examiner.*

A. SKAPARS, *Assistant Examiner.*

U.S. Cl. X.R.

117—217; 204—47